United States Patent [19]

Farmer et al.

[11] Patent Number: 4,748,667
[45] Date of Patent: May 31, 1988

[54] JAMMING SIGNAL SCRAMBLING AND DESCRAMBLING SYSTEMS FOR CATV

[75] Inventors: James O. Farmer, Lilburn; Anatoly Kozushin, Duluth; Herman A. Kruse, Winder; William P. LaFay; Christopher P. Lewis, both of Snellville; Frank R. Little, Jr., Alpharetta; Leo Montreuil, Atlanta; Leo J. Thompson, Lilburn; Lamar E. West, Jr., Maysville; Joseph G. Mobley, II, Dunwoody, all of Ga.

[73] Assignee: Scientific Atlanta, Atlanta, Ga.

[21] Appl. No.: 926,749

[22] Filed: Nov. 4, 1986

[51] Int. Cl.⁴ .................. H04N 7/167; H03H 7/00
[52] U.S. Cl. ........................ 380/7; 333/176; 455/1; 455/286; 455/339
[58] Field of Search .......... 455/1, 286, 339; 380/7; 333/176, 155, 193

[56] References Cited

U.S. PATENT DOCUMENTS

| | | |
|---|---|---|
| 2,905,747 | 9/1959 | Kidd . |
| 3,059,054 | 10/1962 | Reiter . |
| 3,202,758 | 8/1965 | Brownstein . |
| 3,347,982 | 10/1967 | Bass . |
| 3,760,097 | 9/1973 | Burroughs . |
| 3,859,457 | 1/1975 | Kirk . |
| 3,896,262 | 7/1975 | Hudspeth . |
| 3,898,375 | 8/1975 | Hannan et al. ............ 380/7 |
| 3,989,887 | 11/1976 | Murphy . |
| 4,024,575 | 5/1977 | Harney . |
| 4,074,311 | 2/1978 | Tanner . |
| 4,097,894 | 6/1978 | Tanner . |
| 4,099,203 | 7/1978 | Garodnick . |
| 4,126,837 | 11/1978 | Koyamada et al. ........ 333/196 |
| 4,145,716 | 3/1979 | Uemura . |
| 4,148,064 | 4/1979 | Reed . |
| 4,222,067 | 9/1980 | Stern . |
| 4,268,860 | 5/1981 | Blonder ................ 380/7 |
| 4,357,709 | 11/1982 | Butler . |
| 4,398,214 | 8/1983 | Gargini . |
| 4,466,017 | 8/1984 | Banker . |
| 4,577,168 | 3/1986 | Hartmann ................ 333/193 |
| 4,581,765 | 4/1986 | Stec . |
| 4,623,918 | 11/1986 | Chomet . |

*Primary Examiner*—Stephen C. Buczinski
*Attorney, Agent, or Firm*—Martin LuKacher

[57] ABSTRACT

Scrambling and descrambling systems utilizing jamming signals provide improved pictures with minimal distortion due to ghosts and artifacts. The television signal is combined with a jamming signal or signals located preferably in the vestigial sideband (VSB) of the modulated picture carrier and at about a null in the spectrum of the modulation of the picture carrier by the horizontal sync. The jamming signal or signals also preferably are placed between the harmonic components of the horizontal sync which define the horizontal sync spectrum and at frequencies which comply with governmental regulations respecting frequency locations of strong signals of CATV purposes. The jamming signals are generated by phase locking to the horizontal sync signals of the television signals or to a submultiple of the horizontal sync frequency. Artifacts are further reduced by preemphasis of the transmitted television signal in the sideband opposite to that in which the jamming signal or signals are located and spaced by an equal frequency increment from the location of the jamming signal energy. In order to extract the jamming signal, so as to descramble the television signal for reproduction in the subscriber's television receiver, a network including at least one surface acoustic wave (SAW) resonator device is embedded in an all-pass network which allows essentially lossless transmission of the television signal spectrum, except for the jamming signal energy and enables that energy to be located close to (e.g., approximately 228 KHz) from the picture carrier in the VSB for enhanced security.

65 Claims, 9 Drawing Sheets

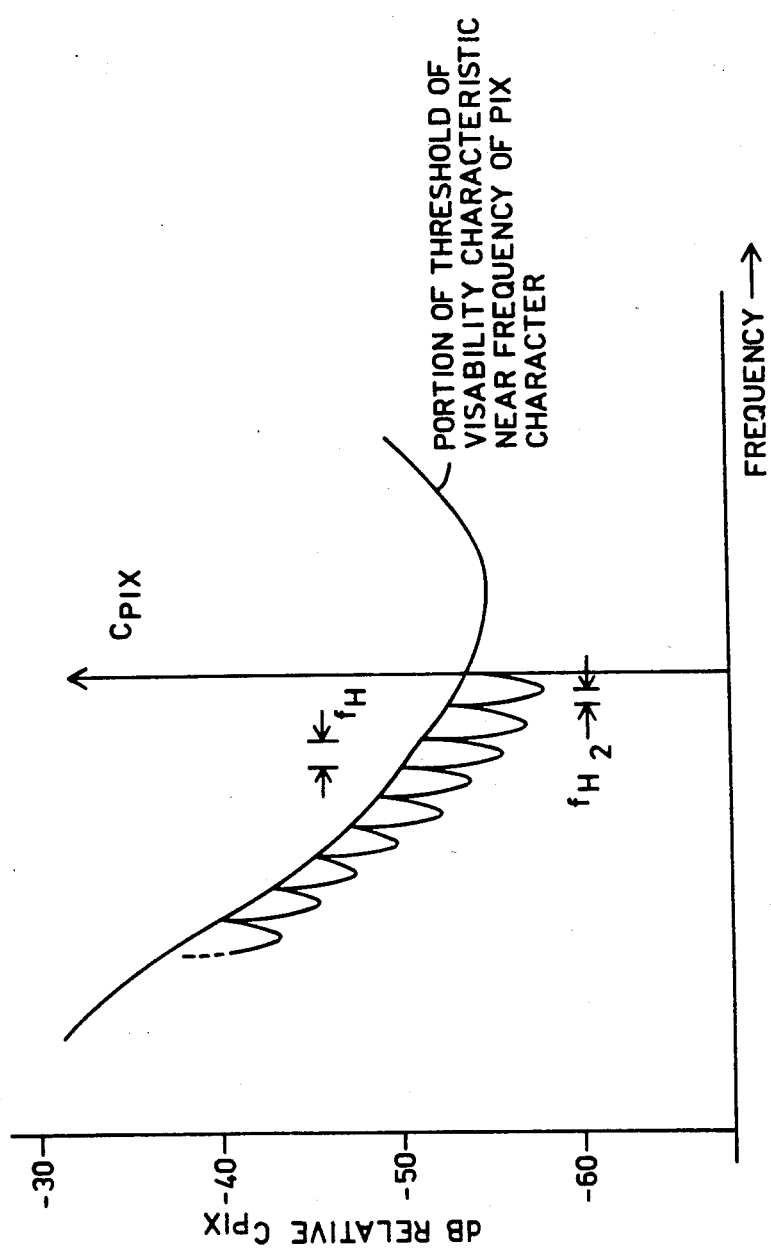

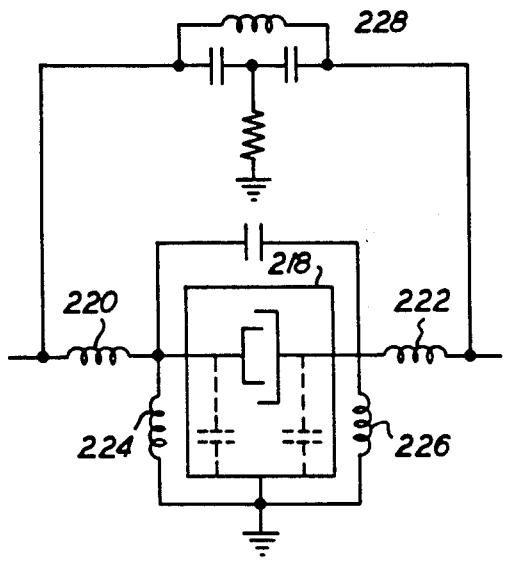
FIG. 14
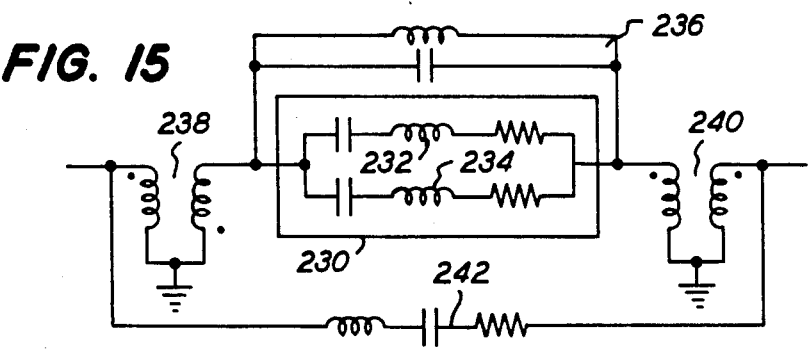
FIG. 15
FIG. 16
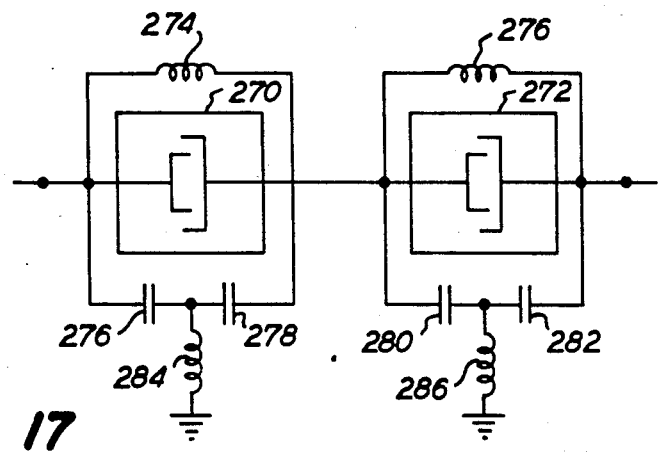
FIG. 17

JAMMING SIGNAL SCRAMBLING AND DESCRAMBLING SYSTEMS FOR CATV

DESCRIPTION

Present invention relates to community antenna television (CATV) or subscriber television systems wherein premium programs are transmitted with security against reception by unauthorized subscribers, and particularly to CATV or subscriber television systems utilizing jamming signals for such security purposes.

The present invention is especially suitable for use in jamming signal scrambling and descrambling systems for CATV which are difficult to defeat by unauthorized subscribers who may have knowledge of the jamming signal frequency. Portions of the invention which are adapted to descrambling may also find applications generally in systems for receiving jammed television signals.

There have been proposed a plethora of techniques for scrambling premium television channels. These include suppression of the synchronizing information (see for example Banker, U.S. Pat. No. 4,466,017 issued Aug. 14, 1984), techniques for insertion and removal of jamming signals, and systems for modulating or otherwise distorting key elements of a signal with pilot tones or other modulation. The jamming signal techniques are the subject of the following U.S. Pat. Nos.: 2,905,747, issued Sept. 22, 1959; 3,059,054, issued Oct. 16, 1962; 3,202,758, issued Aug. 24, 1965; 3,347,982, issued Oct. 17, 1967; 3,760,097, issued Sept. 18, 1973; 3,859,457, issued Jan. 7, 1975; 3,896,262, issued July 22, 1975; 4,074,311, issued Feb. 14, 1978; 4,097,894, issued June 27, 1978; 4,099,203, issued July 4, 1978; 4,148,064, issued Apr. 3, 1979; 4,222,067, issued Sept. 9, 1980; and 4,398,214, issued Aug. 9, 1983. Reference may be had to the following U.S. Patents for information respecting scrambling systems which modulate key signals for security purposes: 3,989,887, issued Nov. 2, 1976; 4,145,716, issued Mar. 20, 1979; and 4,357,709, issued Nov. 2, 1982.

Jamming signal scrambling and descrambling systems have the advantage of being low in cost and requiring a minimum of equipment, namely a filter which removes the jamming signal frequency only at the locations of those subscribers who prepay for the premium channel. Jamming signal systems of the type which have been heretofore proposed have significant drawbacks. These include distortion of the television signal resulting in visible interference such as ghosts and artifacts and the relative ease of defeating security imposed by the jamming signal by inserting an unauthorized trap filter. Another drawback of prior systems is that there can be feedthrough into the receiver of the authorized subscriber, of a residual jamming signal which distorts the picture from the premium channel.

It is the object of this invention to provide improved jamming signal scrambling and descrambling systems for cable and subscriber TV (whether a physical cable or other communication link such as a broadcast channel is used) which is more difficult to defeat than is the case with prior jamming systems, and which minimizes distortion due to the jamming signal insertion and removal processes.

It has been recognized, in accordance with the invention, that jamming is more difficult to defeat when the jamming signal is close in frequency to the picture carrier. Then, unauthorized jamming signal traps remove picture carrier energy as well as the jamming signal. This results in the distorted reception at the unauthorized television receiver. Placement of the jamming signal close to the picture carrier also exacerbates the problem of eliminating distortion of the jamming signal at authorized subscriber locations. This problem is solved in a number of ways in accordance with the invention. A narrow notch response in the pass band of a device which removes the jamming signal at the authorized subscriber location is obtained through the use of a surface acoustic wave (SAW) resonator or resonators embedded in an all-pass filter. One or more of these resonators may be used in series or in shunt with input and output terminals or ports of the network through which the jammed television signals pass before reaching the receiver of the authorized subscriber.

The effects of distortion due to residual jamming carriers which may pass through the filter are reduced by means which process the television signal to insert the jamming carrier. These processes also minimize ghosts and other artifacts which contribute to the distortion. The processing means minimize the energy which is removed from the television signal. Such removal can cause ringing which results in the picture exhibiting multiple ghosts because of the removal from the spectrum of some of the frequency components present. A principal one of these components is due to the horizontal synchronizing signals (the sync pulses). These pulses modulate the picture carrier with a spectrum consisting of a main lobe centered at the picture carrier and side lobes containing components at the harmonics of the horizontal sync frequency (15.734 KHz). The envelope of the spectrum follows a sin x/x curve which is shown in FIG. 2, and partially also shown in FIG. 3 of the drawings hereof. In accordance with the invention, the jamming signal is located approximately at a null in the spectrum. Since the nulls are quite deep, the location of the jamming signal is not extremely sensitive and it may be varied in order to accommodate governmental requirements (set by the Federal Communications Commission—the FCC—in the United States) that cable TV signals higher than a certain amplitude effectively should be offset from the picture carrier by a multiple of 25 KHz with a tolerance applied to the offset of plus or minus 5 KHz.

The visibility of distortion due to the jamming carrier which may pass through the filter at the subscriber location has threshold of visibility. This threshold varies at the horizontal line rate and has minimums between the harmonic components of the sync spectrum about the picture carrier. By locating the jamming signal between these harmonic components, beat frequencies resulting from feedthrough of the jamming carrier to the receiver (the residual jamming carrier) becomes less visible and the distortion due thereto is reduced.

Artifacts, which also may appear as multiple ghosts, may be reduced by shaping the transmitted television signal. It is preferable to locate the jamming signal in the vestigial sideband rather than in the full sideband of the television signal. The vestigial sideband is at frequencies below the picture carrier and the full sideband is located at frequencies above the picture carrier as shown in FIG. 2 of the drawings hereof. Location of the jamming signal in the vestigial sideband enables the jamming signal to be further attenuated in the receiver due to the receiver response characteristic. In addition, the transmitted signal may be preemphasized in the portion of the full sideband complementary to the location of the jamming signal energy. After filtering in the receiver circuits, wherein Nyquist slope filtering occurs, the frequency response of the television signal is restored to a flat response. The jamming function is not affected and distortion due to artifacts resulting from the removal of the jamming signal energy ahead of the receivers of authorized subscribers is reduced.

Another cause of distortion of the television signal when jamming is used is overloading of the cable distribution system. Such loading can occur when the jamming signal and the television signal add in phase with each other. This may occur when the sync pulses modulate the picture carrier. Then there may be a very high voltage excursion which the amplifiers in the distribution system may not be able to handle without distortion. In accordance with the invention, such distortion as is caused by jamming signals is reduced by modulating the jamming signal so that its envelope is at a minimum when the modulation envelope of the television signal is maximum (at the time of the sync pulses). Since distortion is a function of the level of both signals, distortion is reduced, depending of course on picture content.

It is therefore a further object of the present invention to provide an improved jamming signal scrambling and descrambling system which enables the jamming signals to be transmitted within the frequency region where the peak amplitudes of the lobes of the spectrum of the modulation of the picture carrier by the horizontal synchronizing signals is significant and particularly in the vestigial sideband of the modulated television signal, thereby enabling the jamming energy to be located close to the picture carrier where it cannot readily be removed without distortion by conventional filtering techniques.

It is a still further object of the present invention to provide improved networks for filtering television signals to remove jamming signals therefrom where the jamming signals are located in a frequency region close to the picture carrier, and particularly to networks incorporating SAW resonator devices which present an all-pass response providing negligible attenuation of the television signals except at a limited range of frequencies (a notch) where the jamming signal energy is located.

Briefly described, a system for processing television signals in accordance with the invention is operative to process such signals which are in the form of one full sideband and a vestigial sideband of a picture carrier modulated by video and synchronization signals including the horizontal sync signals. The system provides for the intelligible reception of the television signals by TV receivers of certain subscribers, the system includes means for combining the television signals with jamming signal energy, the frequency of which is substantially at the frequency of one of the nulls of the spectrum of the modulation of the picture carrier by the horizontal sync signals. The system includes means for transmitting the combined jamming and television signals to receiver locations and also means at these locations disposed ahead of the TV receivers of the authorized subscribers which define a pass band for the transmitted signals without substantial attenuation except that a notch essentially at the frequency of the jamming signal energy.

The foregoing and other objects, features and advantages of the invention as well as the presently preferred embodiments thereof will become more apparent from a reading of the following description in connection with the accompanying drawings in which.

Figure 1:
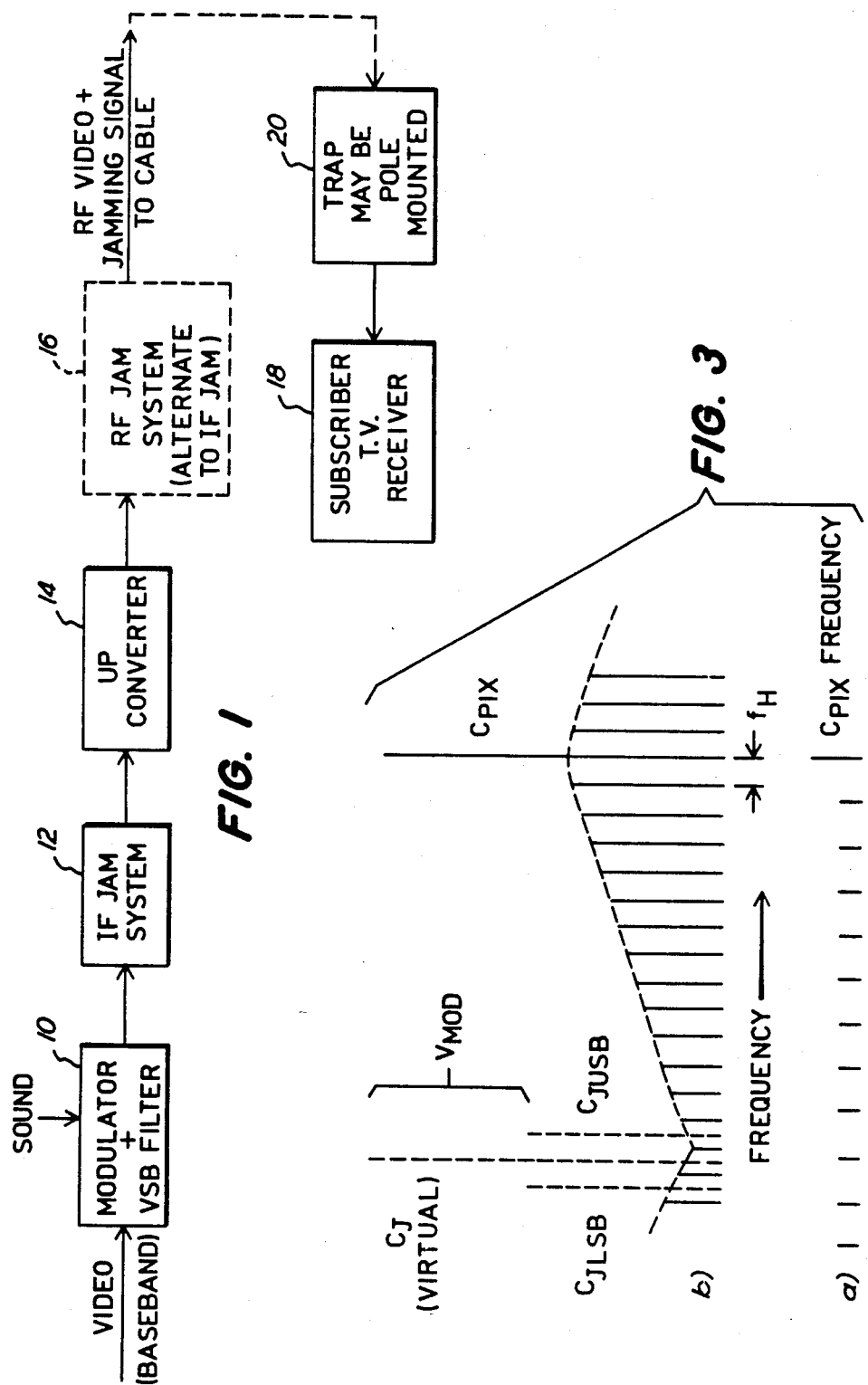
FIG. 1 is a block diagram of a CATV system incorporating a jamming signal scrambling and descrambling system in accordance with the invention.
Figure 2:
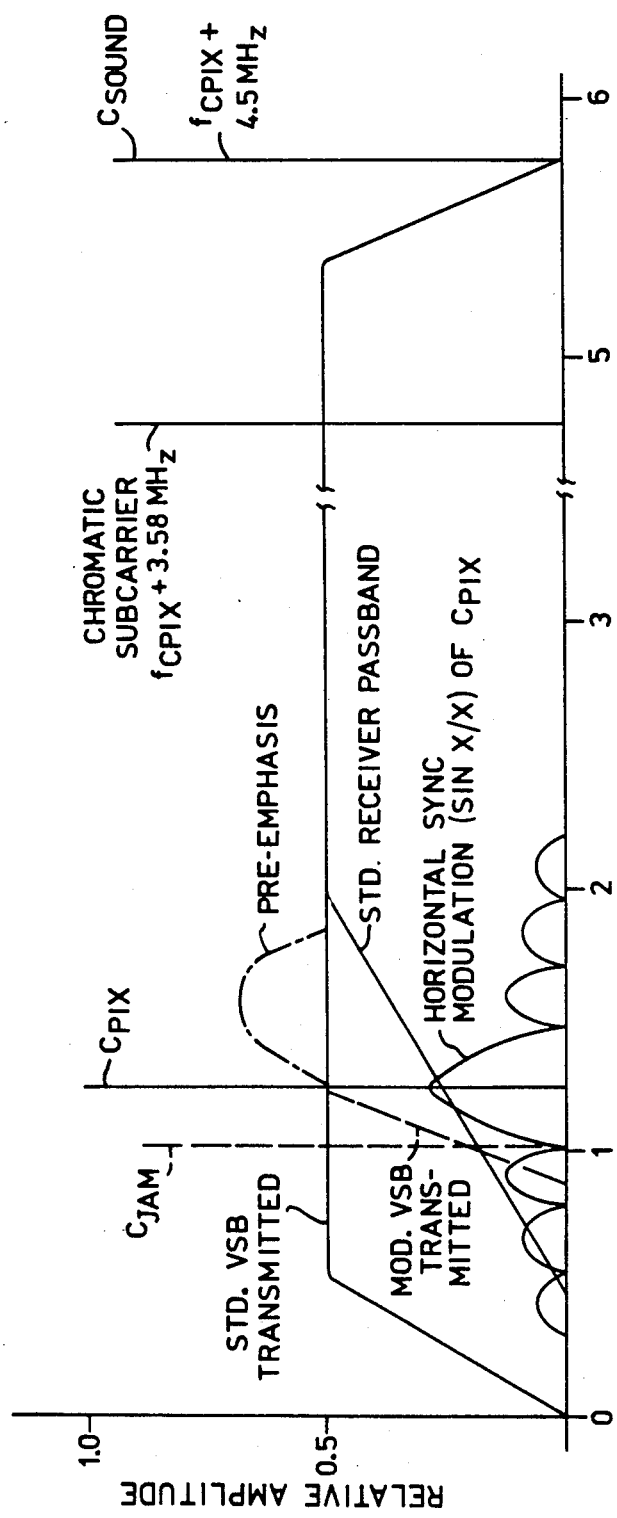
FIG. 2 is a curve showing the spectrum of the television signals, the response of the receiver and the location of the various carriers thereof.
Figure 5:
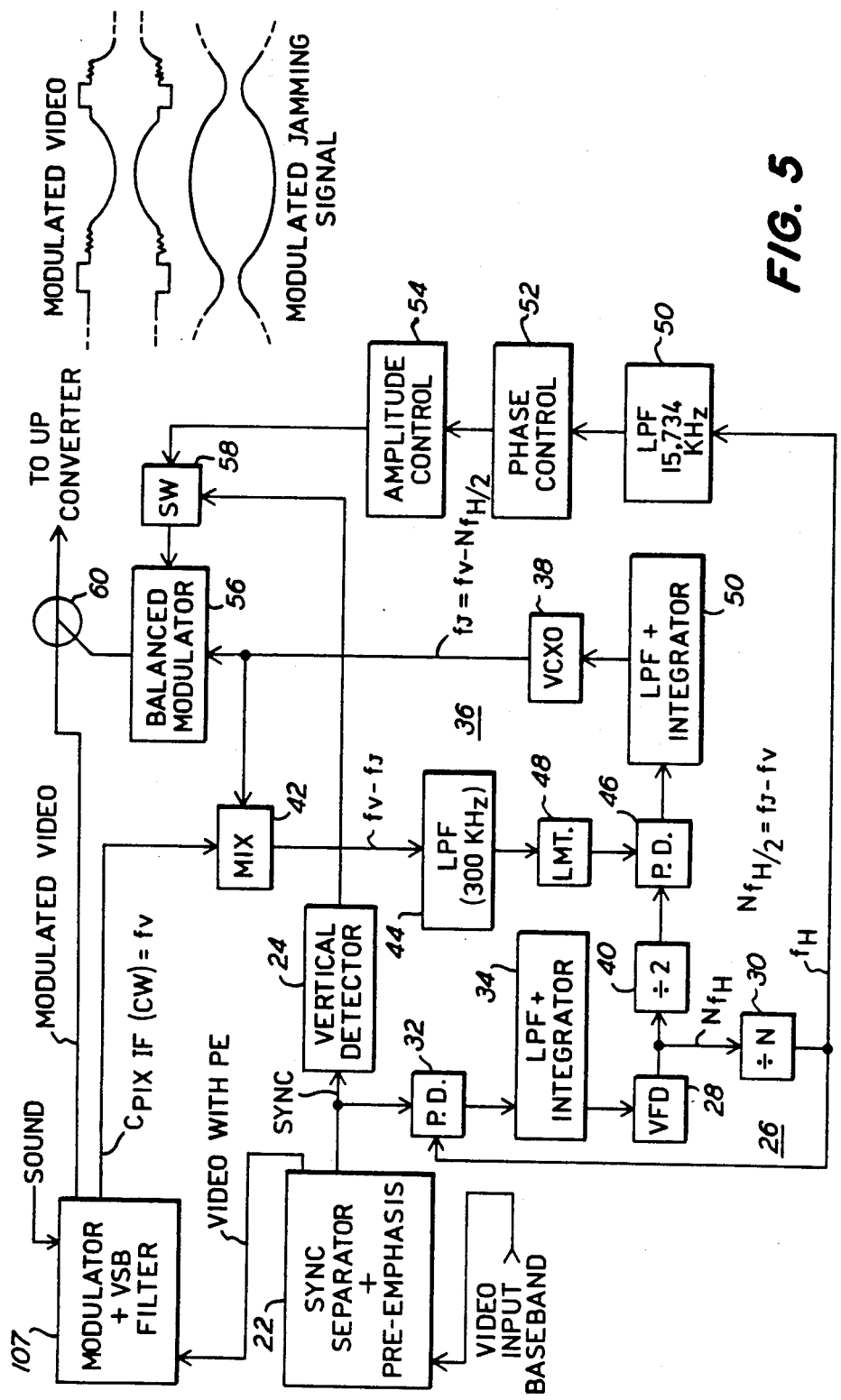
Figure 6:
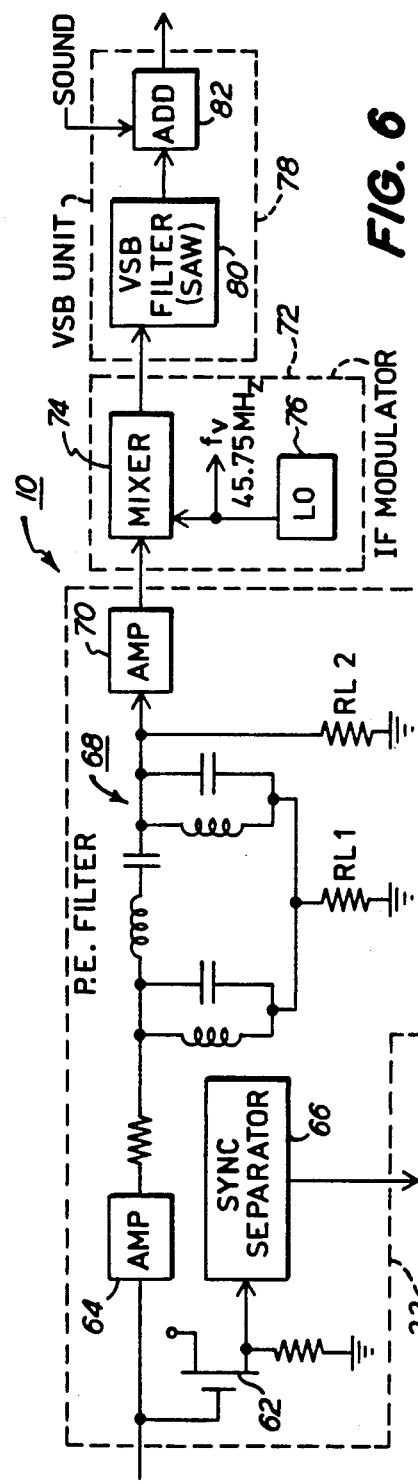
Figure 7:
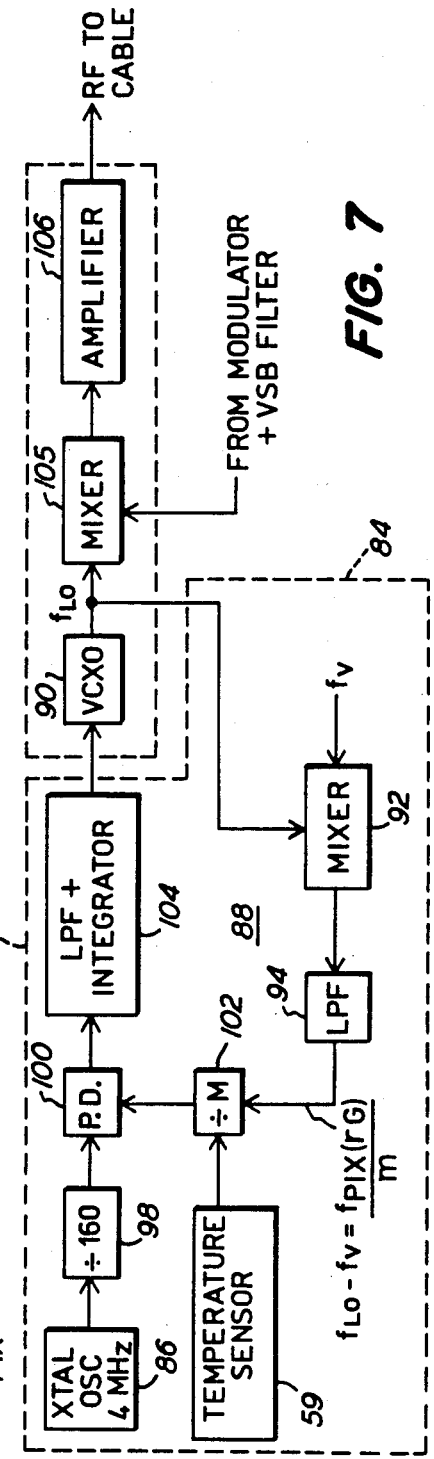
Figure 8:
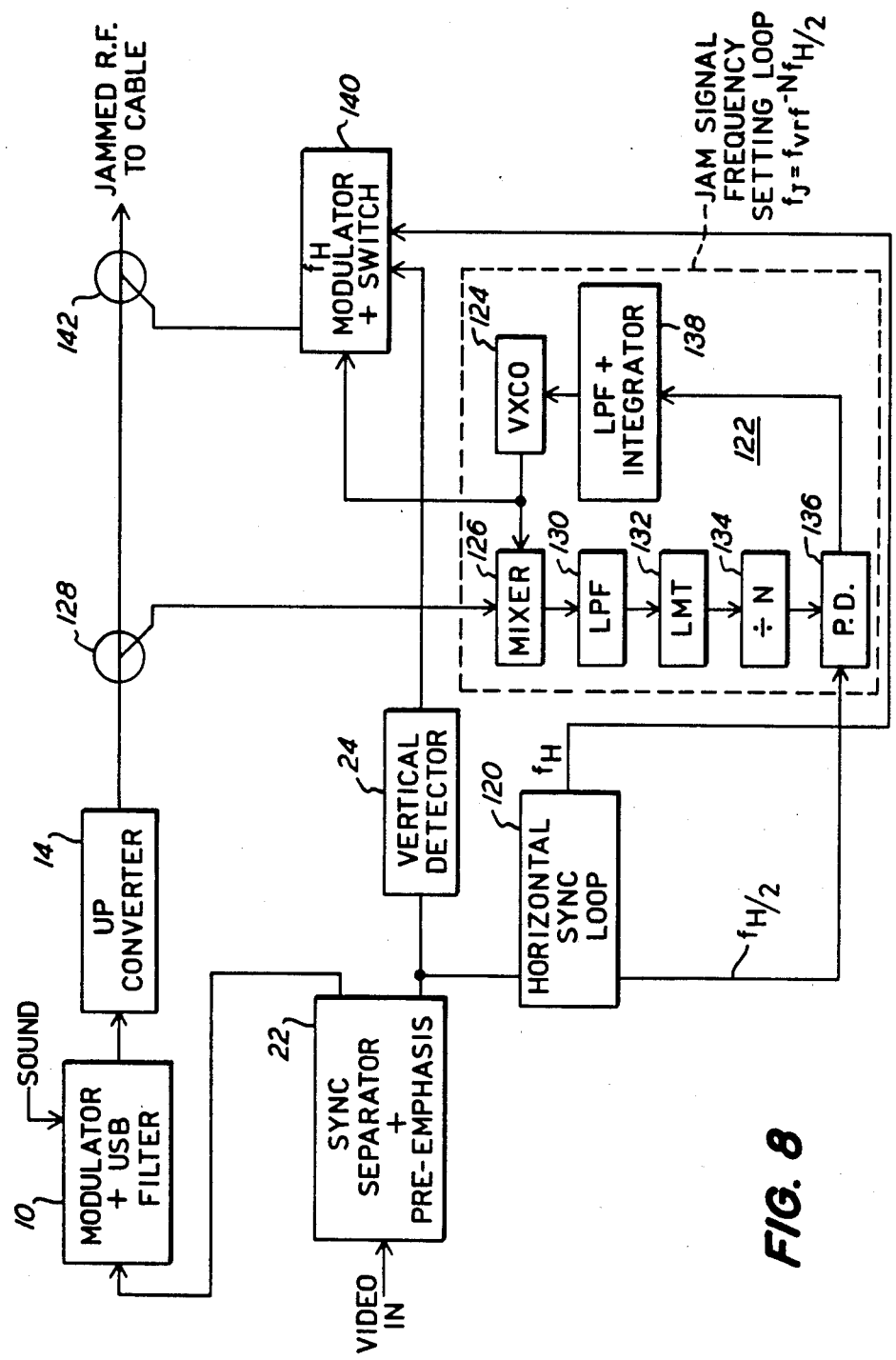
Figure 9:
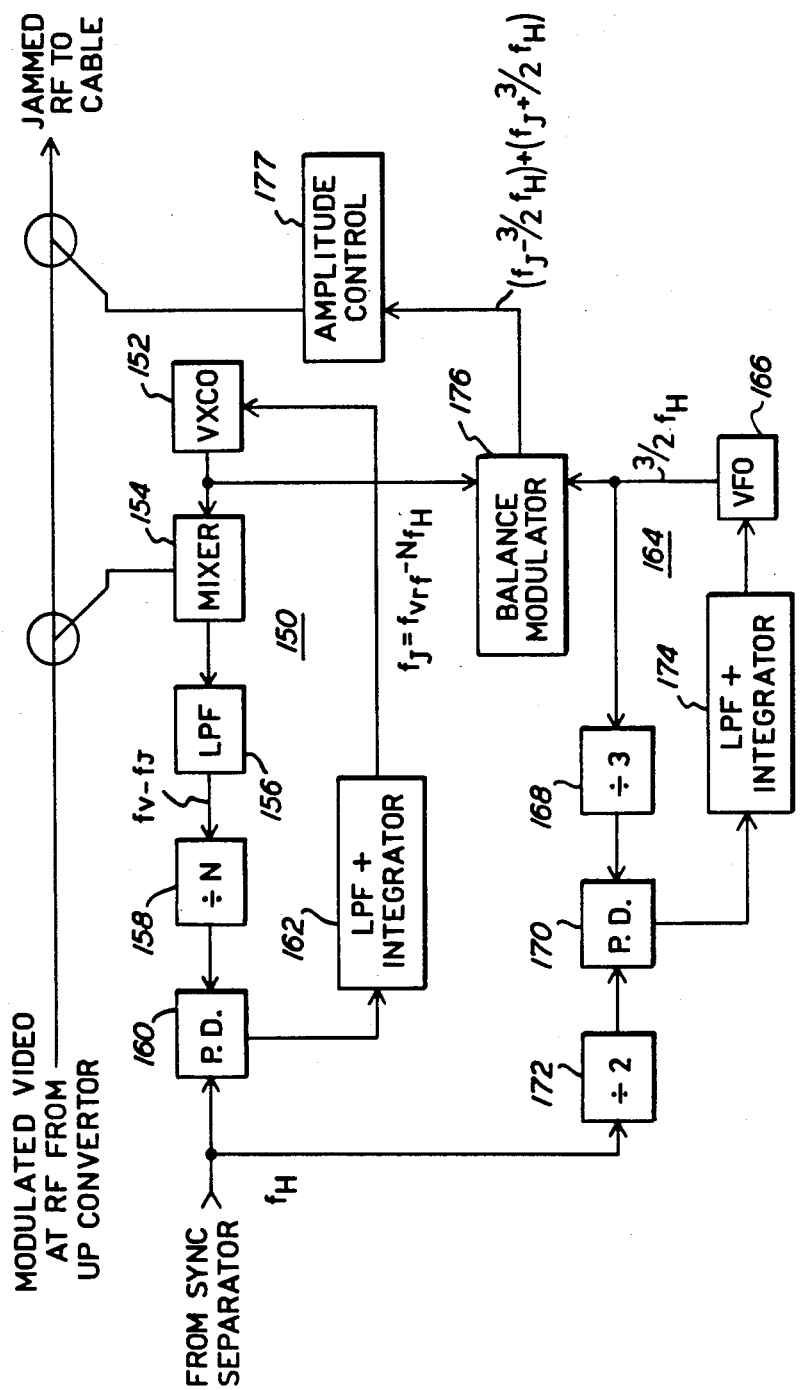

FIG. 3 presents in parts (a) and (b) thereof, respectively, the location of the frequencies authorized by FCC regulations and the spectrum of the horizontal sync modulation which is also shown in FIG. 2, but is shown enlarged in FIG. 3;

FIG. 4 is a curve representing a portion of the threshold of visibility characteristic of television receivers and which further explains the preferred location of the jamming signal energy in accordance with the invention;

FIG. 5 is a block diagram of a system for generating a combined television and jamming signal at intermediate frequency which is provided in accordance with the invention;

FIG. 6 is a more detailed block and schematic diagram of the sync separator, modulator and VSB filter shown in FIG. 5;

FIG. 7 is a block diagram of an accurately controlled up-converter which may be used in the system shown in FIG. 1 and in FIG. 8;

FIG. 8 is a block diagram showing a system for generating a combined television and jamming signal at radio frequency;

FIG. 9 is a block diagram illustrating a portion of a system for generating a combined television and jamming signal in accordance with another embodiment of the invention;

FIGS. 10 through 17 are schematic diagrams illustrating networks which are useful in the system illustrated in FIG. 1 for attenuating and removing jamming signal energy.

FIG. 1 illustrates both the head end and the subscriber portion of jamming signal scrambling and descrambling systems which may be provided in accordance with the invention in an overall manner. The video signal containing both the picture information and the synchronizing signals (horizontal and vertical sync) as derived from the television camera or other source of television signals is applied at base band (0 to approximately 6 MHz) to a modulator and vestigial sideband (VSB) filter unit 10. The sound signal which may be FM modulated on a 4.5 MHz carrier, offset to IF frequency, is also applied to the unit 10. The unit 10 provides the modulated television signal wherein both the sync and picture components modulate a picture carrier at 45.75 MHz.

The modulated IF television signal is applied to a jamming system which generates and combines the jamming signal with the television signal at intermediate frequency. This system is referred to as the IF jam system 12 in FIG. 1. The combined IF television and jamming signal is up-converted to the premium RF television channel by an up-converter 14. The output of the up-converter is at radio frequency. Alternatively to an IF jamming system wherein the jamming signal is added at intermediate frequency, an RF jamming system 16 may be used which inserts the jamming signal at radio frequency. The RF signal is then applied to the transmission link. In CATV systems this is the cable which connects via distribution amplifiers to the various subscriber locations. Each subscriber has his own TV receiver or receivers 18. In order to be enabled to receive the premium channel, a trap network 20 is provided ahead of the receiver. This network may be located externally to the residence of the subscriber, as on a pole. It may be located at the side of the subscriber's house. In the event that several subscribers, as in an apartment distribution system, are entitled to receive the premium programming the trap may be located in the distribution equipment for the several apartments which may be on the same premises.

Referring to FIG. 2 there is shown the standard vestigial sideband television signal at a suitable radio frequency channel. The vestigial sideband is to the left of the picture carrier ($C_{pix}$) and the full sideband is to the right of the picture carrier. The picture carrier is at 1.25 MHz above the lower boundary of the channel in accordance with accepted (NTSC) standards. The spectrum of the horizontal sync modulation of the picture carrier is also illustrated in FIG. 2. This spectrum is made up of harmonic components based from the picture carrier at frequency increments equal to the horizontal sync frequency (15.734 KHz). The envelope of these components follows a sin x/x curve with minimums at the reciprocal of the duration of the horizontal sync pulses. Nominally this duration is 4.7 microseconds. The nulls in the spectrum therefore occur at multiples of the reciprocal of 4.7 microseconds or at 212.766 KHz.

FIG. 3 illustrates a portion of the horizontal sync modulation spectrum which includes the first null between the main lobe and the first side lobe in the vestigial sideband on a larger scale than in FIG. 2. The frequency separation of the harmonic components is the horizontal sync frequency $f_H$.

FIG. 2 also shows the standard receiver pass band at RF. The Nyquist slope due to the nominal front end response of the television reciever RF and IF circuits is also shown. The spectrum of the television signal also illustrates the location of the sound carrier at 4.5 MHz and of the chromatic subcarrier at about 3.58 MHz.

The present invention locates the jamming signal and the trap close to the picture carrier, and preferably where the horizontal sync modulation spectrum in terms of the maximum amplitude of the lobes of the spectrum, is significant (greater than about 1.8% or about—35 dB) with respect to the amplitude of the picture carrier. This range includes the main lobe and the two closest side lobes and may extend into a portion of the third side lobe.

The spectral distribution of the sync pulse energy in the television signal is taken advantage of to minimize the energy removed from the signal and therefore minimize the effect of distortion due to the removal of such energy. In the absence of provisions for minimizing the removed energy from the signal, ringing occurs which results in ghosting in the reproduced television picture. Preferably the null which is used is the first null in the vestigial sideband. The jamming signal resides in that null. It is desirable as shown in FIG. 3 to provide the jamming signal between the harmonic components of the horizontal sync spectrum and also at frequencies allowed by FCC regulations. The spectral characteristic is not extremely sensitive and the null may not be coincident with a spectral line. By locating the jamming signal in the vicinity of the null, minimum disruption of the sync pulse information upon the removal of the jamming signal by the trap (20—FIG. 1) and hence minimum ringing of the sync through the picture (sync ghosts) is obtained.

Artifacts and ringing due to removal of the jamming signal is further reduced by restoring the energy in the full sideband. Such restoration is obtained by preemphasis of the television signal. The preemphasis response is indicated by the line made up of dashes and dots in FIG. 2. The center of the preemphasized range is at a frequency equal and opposite to the displacement of the jamming signal from the picture carrier. Artifacts due to loss of energy when the carrier is removed are minimized because information is duplicated in the two sidebands of the modulated television signal. By supplying energy in the full sideband in a region complementary to the region in the vestigial sideband where the jamming carrier is reduced, artifacts may be eliminated.

Artifacts and ringing due to the removal of the jamming signal energy may alternatively be reduced by utilizing a modified VSB transmission characteristic. A modified VSB filter may be used for this purpose or the signal may be routed through a special filter which provides the modified VSB response. The effect of energy of the jamming signal in the presence of the modified VSB response which is present in the receiver because of its pass band characteristic is approximately the same whether the standard VSB characteristic or the modified VSB characteristics are used. This will be apparent because the modified VSB characteristic, the jamming signal and the sloping portion at the lower frequencies of the receiver passband cross at approximately the same frequency. Preemphasis may still be used to compensate for loss of energy, if desired, even if a modified VSB transmission characteristic is utilized.

The presence of the jamming signal after the trap (residual jamming signal) causes distortion of the TV picture. Such distortion may be minimized by taking advantage of the characteristics of the visibility of the distortion (which may appear as a beat in the picture). The visibility of residual jamming signal distortion is a function of the offset of the jamming carrier from the picture carrier. The curve in FIG. 4 is a portion of the standard "W" curve of the threshold of visibility of intermodulation distortion. This curve has a fine grain structure in the ripple which is related to the horizontal line rate of the transmitted picture. The maximum of the ripple occurs at frequencies of offset equal to an odd multiple of one-half the horizontal line rate. Accordingly, by placing the jamming signal between the harmonics of the horizontal sync spectrum, the beat distortion resulting from the feed through of residual jamming carrier is less visible than it would have been otherwise.

FIG. 2 also shows that the jamming signal is approximately the same amplitude as the picture carrier. FCC restrictions apply to signals carried on the cable at levels exceeding 0.1 milliwatts. These restrictions require the jamming signal to be offset from the picture carrier by a multiple of 25 KHz with a tolerance applied to the offset of plus or minus 5 KHz. It is assumed that the picture carrier is already at the required offset. The offset requirements have been imposed because channels alloted to other communication services are at multiples of 25 KHz. The strong signals on the cable are therefore required to be between these multiples or spaced approximately 12.5 KHz (plus or minus 5 KHz) from the channels alloted to other services.

In summary the jamming signal is preferably placed close to the picture carrier and at frequencies which satisfy the following criteria:

a. The jamming signal should be placed at multiples of the reciprocal of the sync width which for standard (NTSC) transmission is 4.7 microseconds. The nulls in the horizontal sync modulation spectrum are therefore at multiples of 212.766 KHz offset from the picture carrier. The null is not a sensitive function, but the location of the jamming carrier should be in the null and may be at frequencies which satisfy the other criteria.

b. The jamming signal should be locked to odd multiple of ½ the horizontal line rate (an odd multiple of 7.867 KHz) in order to reduce the distortion due to any residual jamming carrier at the receiver.

c. The jamming carrier should be offset from the picture carrier by a multiple of 25 KHz in a range plus or minus 5 KHz.

The following chart sets forth suitable off-set frequencies from the picture carrier frequency. These frequencies may be in the full side band, but preferably are in the vestigial side band. In the chart "N" is the multiple of ½ the line frequency ($f_H/2$). The error is the frequency error with respect to the FCC required off-set. An asterisk appears next to the number in the "N" column corresponding to off-set frequencies of 196.7, 228.1, 401.2, 448.4, 621.5, 653.0, 826.0, 873.3, 1046.3, 1077.8 KHz. These frequencies satisfy criterion (a). The other frequencies and these frequencies satisfy criteria (b) and (c). It will be noted that the preferred jamming signal frequency which is closest to the null between the main lobe and the first side lobe of the horizontal sync modulation spectrum is 228.1 KHz. This off-set differs slightly from the exact location of the null at 212.76 KHz. 228.1 KHz also satisfies criteria (b) and (c) and is sufficiently close to satisfy criterion (a).

TABLE I

| N | Offset frequency KHz | Error KHz |
|---|---|---|
| 13 | 102.3 | 2.3 |
| 19 | 149.5 | 0.5 |
| 25* | 196.7 | 3.3 |
| 29* | 228.1 | 3.1 |
| 35 | 275.3 | 0.3 |
| 41 | 322.6 | 2.4 |
| 45 | 354.0 | 4.0 |
| 51* | 401.2 | 1.2 |
| 57* | 448.4 | 1.6 |
| 61 | 479.9 | 4.9 |
| 63 | 495.6 | 4.4 |
| 67 | 527.1 | 2.1 |
| 73 | 574.3 | 0.7 |
| 79* | 621.5 | 3.5 |
| 83* | 653.0 | 3.0 |
| 89 | 700.2 | 0.2 |
| 95 | 747.4 | 2.6 |
| 99 | 778.8 | 3.8 |
| 105* | 826.0 | 1.0 |
| 111* | 873.3 | 1.7 |
| 115 | 904.7 | 4.7 |
| 117 | 920.5 | 4.5 |
| 121 | 951.9 | 1.9 |
| 127 | 999.1 | 0.9 |
| 133* | 1046.3 | 3.7 |
| 137* | 1077.8 | 2.8 |

FIG. 3 shows the jamming signal $C_j$ which is centered with respect to two sidebands $C_{JLSB}$ and $C_{JUSB}$. As will be explained with reference to FIG. 5 it is preferable to modulate the jamming signal for purposes of reducing distortion due to loading because of the adding of the carrier voltages of the jamming and signal carriers, especially at the time of the horizontal sync pulses. The energy of the jamming signal is effectively at the $C_J$ carrier frequency. This carrier frequency is at the 228.1 KHz off-set from the picture carrier. It will be noted, from the location of the allowed frequencies (25 KHz off-set from the picture carrier as shown in line (a) of FIG. 3), that the jamming carrier (the frequency location of $C_j$) is at an allowed FCC frequency, the frequency scales of parts (a) and (b) of FIG. 3 being aligned and identical.

Referring to FIG. 5, there is shown a presently preferred embodiment of a system for generating the jamming signal and combining it with the television signal. The system generates the jamming signal precisely by phase locking to the horizontal sync. The video signal at base band which includes sync is applied to a sync separator and preemphasis unit 22. Both horizontal and vertical sync are stripped. The vertical sync is separated by a vertical sync detector 24 and used in the modulation of the jamming signal as will be discussed further below. The horizonal sync is recovered by a phase lock loop 26. This loop 26 has a variable frequency oscillator 28 which produces an output signal nominally "N" times the horizontal sync frequency. The factor "N" is selected in accordance with the Table I above to provide the requisite off-set of the jamming signal. For jamming signal energy centered at 228.1 KHz off-set, a factor "N" of 29 is used. A divider 30 which divides by "N" provides an input to a phase detector 32. The output of this phase detector is filtered and integrated in a unit 34 to control the frequency of the oscillator 28 so as to be exactly at $Nf_H$.

The jamming signal locked to $Nf_H$ but off-set by the picture carrier frequency is obtained in another phase locked loop 36. The picture carrier frequency signal $f_V$ is an output from the modulator and VSB filter 10, which also appears in FIG. 1. The modulator and filter 10 provides the modulated video signal at intermediate frequency. The video signal (preemphasized) is applied to the modulator 10 and modulates the picture carrier at 45.75 MHz to produce the IF modulated video signal. The carrier frequency may be obtained directly from the output line on which the modulated video signal appears since the loop 36 has a band width sufficiently restricted to extract that signal from the modulated video signal. It is preferred, however, to use the unmodulated picture carrier signal since it is available from the modulator and filter unit 10.

The loop 36 has a voltage controlled crystal oscillator (VCXO) 38. This oscillator is locked to produce the jamming signal $f_J$ which is equal to the carrier frequency off-set by $N \times \frac{1}{2}$ the horizontal sync rate so as to locate the jamming carrier at the required half line rate, between the harmonic components of the horizontal sync modulation spectrum as shown in FIGS. 2 and 3. The signal at $Nf_H/2$ is obtained from a divide by 2 frequency divider 40 which divides the output of the VFO 28 in the horizontal sync loop 26. The VXCO 38 output is mixed in a mixer 42 with the picture carrier signal $f_V$. The lower sideband ($f_V$ minus $f_J$ is selected by a low pass filter 44 having suitably a 300 KHz band pass. The output is limited in a limiter 48 to provide a square wave which is compared with the square wave from the divider 40 in a phase detector 46. The control voltage is obtained from the phase detector by a low pass filter and integrator 50 and controls the frequency of the VCXO 38. The jamming signal is locked to the horizontal sync rate and is off-set from the picture carrier into the vestigial sideband in the region of the first null in the horizontal sync spectrum.

It is desirable that the carrier be modulated in order to obtain a modulated jamming signal as indicated by the wave form shown to the right of the figure. Also shown to the right of the figure is the modulated video signal to which the modulated jamming signal will be added. The jamming modulation is phased so that the peak of the jammer envelope occurs in the middle of the horizontal line and the trough in the jammer envelope coincides with the sync tips on the video carrier. The combined television and jamming signal therefore minimizes loading created by the jamming signal on the distribution system of the cable network.

This loading occurs because all of the carriers on the cable will, at some time, be in phase with each other. Then, all the carrier's voltages add, resulting in a very high voltage excursion which the amplifiers in the distribution system must handle. In some instances the modulators and the up-converter may be required to handle not only the video signal but its associated audio carrier and the jamming signal. This addition of carriers may represent a very large increase in signal level. Such an increase is ameliorated by modulating the jamming signal and locating it (phasing) so that the amplitude excursions of the combined signal are minimized.

In order to provide the modulation at the horizontal sync rate, the recovered horizontal sync signal at $f_H$ is translated into a sinusoidal signal by a low pass filter 50. This filter recovers the 15.734 KHz fundamental component of the horizontal sync signal. This component is phase shifted in a phase control circuit 52. The amplitude of the 15.734 KHz modulation is adjusted in an amplitude control 54. The modulating signal is applied to a balanced modulator 56 through an electronic switch 58 which is controlled by the vertical detector 24. Because the energy in the middle of the horizontal line is maximum in the vertical interval, it is desirable to inhibit the modulation during the vertical interval. The balanced modulator 56 is adjusted so that a low amplitude jamming signal without modulation is produced when the 15.734 KHz modulation is inhibited.

The phase of the modulating signal is controlled so that the modulating jamming signal envelope is at a minimum during the sync tips when the picture carrier is at its maximum amplitude as shown in the wave forms in FIG. 5. Then third order distortion due to the jamming signal and the picture carrier amplitudes adding will be reduced by at least 5 dB depending upon the picture content. The amplitude control adjustment provides a peak envelope value of the jamming signal envelope equal to the peak value of the picture carrier. Jamming is enhanced over what is accomplished by using an unmodulated or CW jamming signal of the same level. It is believed that the enhancement in jamming effect arises out of the operation of the synchronizing circuits in the television receiver. The synchronizing circuits detect sync as occurring at variable times. Thus the jammed picture has considerable interference, does not lock and rolls erratically.

The modulated jamming signal is combined additively with the modulated television or video signal in a directional coupler 60. The combined television and jamming signal is applied to the up-converter (14—FIG. 1).

The trap 20, as will be discussed more fully hereinafter in connection with FIGS. 10 through 17, preferably includes one or more surface acoustic wave (SAW) resonator devices. Such devices have the characteristic of changing their resonant frequency with temperature. For example the resonant frequency of the devices may reduce when the temperature changes from a nominal or turnover frequency. This frequency may be set for a temperature which is average in the vicinity of the CATV system. It is frequently set to 25 degrees centigrade. In order to correct for temperature drift of the traps, the temperature at the head end of the CATV system may be sensed by a temperature sensor $T_s$ which controls a frequency offset circuit. This offset circuit offsets the jamming signal frequency by 25 KHz and provides a step to a lower allowed frequency 25 KHz removed from the nominal frequency of the jamming signal whenever the temperature is either higher or lower than the preset temperature by a predetermined amount. This temperature compensation is optional and therefore is shown implemented by the temperature sensor 59 which changes divisor, M, in FIG. 7. Changing the divider will cause the local oscillator frequency $f_{LO}$ to shift 25 KHz, which will in turn cause the picture carrier frequency and jammer to shift 25 KHz. Unless the temperature changes by the amount required, which will occur during extremes of hot and cold weather, the frequency offset circuit is inhibited.

Referring to FIG. 6, the modulator and VSB filter unit is illustrated in detail. The video input is applied to an FET 62 which presents a high impedance input to the video signal line. The video signal is also buffered in an amplifier 64. The FET stage provides the signals to a conventional sync separator 66 which strips the sync. The horizontal sync is recovered in the sync recovery loop 26 (FIG. 5).

The video signal is then applied to a preemphasis filter (P.E. Filter 68). This filter may suitably be implemented by a three-pole band pass circuit which places a load indicated at R.L. 1 in parallel with an output load R.L. 2 at all frequencies except in the pass band of the filter 68. Then R.L. 1 is disconnected from the output load R.L. 2. When R.L. 1 is in the circuit, the output amplitude is reduced from that when R.L. 1 is out of the circuit. The pass band then corresponds to the preemphasized characteristic response shown in FIG. 2.

The pass band of the filter 68 is selected so that the full sideband portion of the television signal response is at a position complementary to the jamming signal energy so as to compensate for the removal of the jamming signal energy in the vestigial sideband. A buffer amplifier 70 couples the preemphasized television signal to an intermediate frequency modulator (IF Modul. 72). This modulator 72 has a mixer 74 and a local oscillator 76 which generates the picture carrier at 45.75 MHz. The picture carrier is modulated by the television signal and transmitted to the vestigial sideband (VSB) unit 78 which contains a VSB filter 80, suitably a SAW filter. It may be selected to have the standard VSB transmission response or the modified VSB transmission response, both of which are shown in FIG. 2. The VSB transmission is applied to an adder circuit 82 wherein it is added to the sound signal. The sound signal may be FM modulated and offset to a frequency 4.5 MHz above the picture carrier. The composite IF television signal is then combined with the modulated jamming signal at IF in the IF jamming system 12 as is illustrated in detail in FIG. 5 and then applied to the up-converter 14. Alternatively the VSB television signal may be up-converted and combined at RF with an RF jamming signal in an RF jamming system 16. An RF system is illustrated in FIG. 8 and another RF jamming system is illustrated in FIG. 9.

Referring to FIG. 7 there is shown an up-converter having a frequency controller circuit 84 which locks the RF signal to a precision crystal oscillator 86. This oscillator may for example produce a stable output signal at 4 MHz. A control loop 88 is used which locks the local oscillator injection, $f_{LO}$, to the crystal oscillator frequency as a standard. The local oscillator signal is generated in a voltage controlled crystal oscillator (VCXO) 90. The local oscillator signal $f_{LO}$ is mixed in a mixer 92 with the IF picture carrier $f_V$. The lower sideband is selected in a low pass filter 94. The lower sideband is divided by M to provide an output which divides equally by 25 KHz; the spacing of the picture carriers at RF being integral multiples of 250 KHz but with the ability for movement in 25 KHz increments if temperature compensation is used, as discussed above. The output of the crystal oscillator 86 is divided by sixteen in a divider circuit 98 and applied to a phase detector 100 with the lower sideband from the mixer 92 which is divided by M in a divider 102. A control signal for the VXCO 90 is derived in a low pass filter and integrator circuit 104. This control signal pulls the VXCO so that the picture carrier at RF in the selected channel is accurately generated. The crystal oscillator 86 may be shifted slightly in frequency in order to accommodate the government (FCC) offset requirements.

The up-converter 14 includes, in addition to the VXCO 90, a mixer 105 which mixes the local oscillator signal $f_{LO}$ with the signal from the modulator and VSB filter 78 (FIG. 6), after combining with the jamming signal if IF jamming is used. The up-converted signal is amplified and filtered in an amplifier 106 which follows the mixer 105. The mixer 105 may be a balanced mixer which suppresses the local oscillator frequency. The amplified and filtered output from the up-converter contains the television signal which may be combined with the jamming signal and located in the selected premium channel. This signal is then combined with all of the other channels which are to be transmitted on the cable.

Referring to FIG. 8 there is shown the modulating and VSB filter unit 10. The up-converter 14 is connected directly to the output of the modulator and VSB filter unit 10 so that the jamming signal may be combined at RF with the up-converted television signal. The system utilizes a sync separator and preemphasis circuit 22 as discussed in connection with FIGS. 5 and 6. A horizontal sync loop 120 extracts the horizontal sync signals at the sync rate $f_H$ and also at ½ the sync rate $f_H/2$. N is selected in order to locate the jamming signal at the desired multiple of $f_H/2$. The multiples N appear in the Table I for suitable frequencies of the jamming signal.

A frequency setting loop 122 sets the jamming signal at an RF frequency equal to $f_{Vrf}$ (the picture carrier at RF) offset by N×½ the horizontal sync frequency. This loop includes a voltage controlled crystal oscillator (VXCO) 124 which produces the $f_J$ jamming signal at RF. This signal is mixed in a mixer 126 with the picture carrier $f_{Vrf}$ which is derived from the output from the up-converter 14 by a directional coupler 128. The lower sideband is selected in a low pass filter 130 which limits the frequency response of the loop so that it can select the picture carrier from the television signal outputted by the up-converter 14. The lower sideband is limited in a limiter 132, divided by N in a divider 134 and compared with $f_{H/2}$.

The jamming signal is modulated by a signal at the horizontal sync rate in a modulator circuit 140. This circuit may include the low pass filter 50, phase control 52, amplitude control 54, and the switch 58 shown in FIG. 5. The switch is operated by the vertical detector 24 so as to inhibit modulation by the line rate signal during the vertical intervals of the television signal. The modulated jamming signal is combined with the television signal at RF in a directional coupler 142 and transmitted as a jammed RF television signal onto the communications link (the cable in the case of a CATV system).

Referring to FIG. 9, there is shown another embodiment of an RF jamming system which produces two jamming carriers, the envelope of which has nulls at the times of the sync pulses in the envelope of the modulated TV signal. The jamming signal $f_J$ is generated at a frequency equal to the picture carrier at RF ($f_{Vrf}$ less N × the horizontal line rate) in a phase locked loop 150. This loop includes a voltage controlled crystal osillator (VXCO 152). The output of the VXCO is mixed in a mixer 154 with the picture carrier at RF ($f_{Vrf}$) which is derived from the modulated video at RF from the up-converter 14. The lower sideband $f_V-f_J$ is derived by a lowpass filter 156. A divider 158 divides the sideband by N so as to provide a signal at the horizontal line rate. This signal is compared with the line rate signal $f_H$ in a phase detector 160. A control signal for the VXCO 152 is derived from the phase detector by a lowpass filter and integrater 162 thereby locking the $f_J$ signal at the location of a selected harmonic component, preferably at the first null in the spectrum of the horizontal sync modulation of the picture carrier.

Modulating signals at $3/2\ f_H$ are derived by another phase locked loop 164. This loop contains a variable frequency osillator 166, the output of which is divided by three in a divider 168 and compared with the half line rate signal which is obtained by a divider 172 which divides the horizontal sync signal $f_H$ from the sync separator by two. A phase detector 170 responsive to the VFO signal divided by three and the horizontal sync signal divided by two, provide a control voltage using a lowpass filter and integrator 174 to lock the VFO at 3/2 the line rate.

A balanced modulator 176 which suppresses the jamming frequency $f_J$ produces two sideband components at ($f_J$ minus $3/2\ f_H$) and ($f_J$ plus $3/2\ f_H$). When derived as shown, the jamming signals will not fall at FCC required offset frequencies. However, on those channels where the offsets are not required, this technique will have some advantages. On channels requiring offsets the two sidebands may be placed further apart on two acceptable frequencies, by changing the value of the 3 circuit 168.

Figure 10:
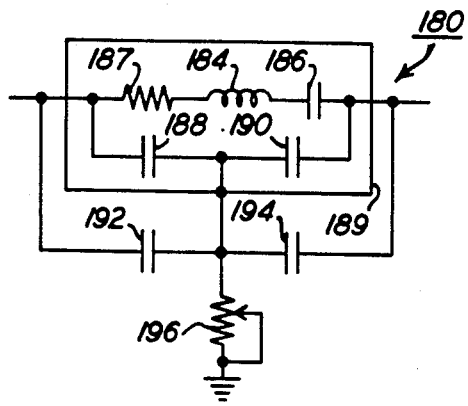

Referring to FIGS. 10 through 17 there are shown various trap or filter networks utilizing SAW resonators. The equivalent circuit of one type of SAW resonator is shown in FIG. 10. The resonator 180 shown there provides an equivalent series circuit of a resistor 182, an inductor 184 and a capacitor 186. These elements may be bridged by another capacitor (not shown in FIG. 10) and two capacitors 188 and 190, the junction of which is connected to the case 189 of the SAW device. The capacitors 188 and 190 and the bridging capacitor (not shown) may be due to the internal capacitance of the transducers in the SAW device which establish and respond to the surface acoustic wave. The SAW device resonates at a particular frequency and defines a very narrow passband centered at that frequency. This passband may be from 50 KHz to 100 KHz wide. The passband is set at the center of the jamming signal energy; i.e., the notch being centered at the jamming signal and being wide enough to include the sidebands.

In order to provide minimum attenuation except in the notch, the SAW resonator is embedded in an all-pass network. All branches of the network have the same resonant frequency. The network can include series branches as well as parallel branches. At the resonant frequency, these parallel branches present infinite impedance to the source while the series branches transfer the signal to the load with minimal attenuation. In the vicinity of resonance, all branches conduct with finite attenuation. By designing all the branches out of inductors and capacitors such that their loaded Q's are equal there will be about zero loss through the network at all frequencies except at the notch where the SAW resonator is resonant.

In other words, the SAW resonator (a series resonant circuit) is located between the input and output of the network (the network's input and output ports) and provides an additional path with zero phase shift at the resonant frequency. The signal at this frequency is cancelled, producing a notch in the frequency response of the network. The SAW device is selected so that its loss at resonance is matched to the loss through the other branches of the all-pass network. This may be accomplished by using variable resistors or selecting the inductors and lead lengths to provide the necessary resistance to equalize and match the losses in each branch.

All pass networks having SAW resonator devices embedded therein are shown in each of FIGS. 10 through 17.

FIG. 10 shows a bridged "T" circuit with the resonator 180 connected in series between the inputs and outputs. Additional capacitors 192 and 194 complete the bridge. Matching is accomplished with the potentiometer 196.

Figure 11:
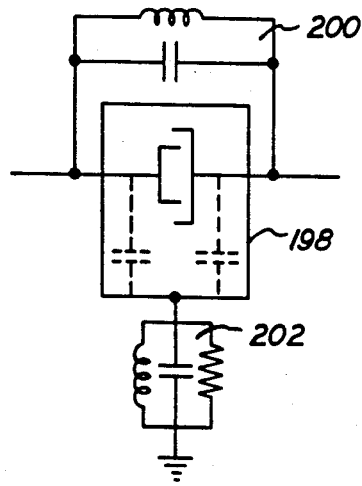

FIG. 11 shows a SAW resonator 198 by its conventional symbol. The capacitors 188 and 190 internal to the resonator, which are connected to the case thereof, are illustrated by the dash lines. The network of FIG. 11 includes parallel resonant LC circuits 200 and 202, respectively, in series and shunt relationship with the input and output ports of the network. The Q and resonant frequency of these circuits 200 and 202 match each other so as to form the all-pass network. Matching may be accomplished by using the resistor in the shunt network 202, which may be variable. The capacitor in the series parallel resonant circuit 200 may be provided by the internal capacitance of the SAW device 198.

Figure 12:
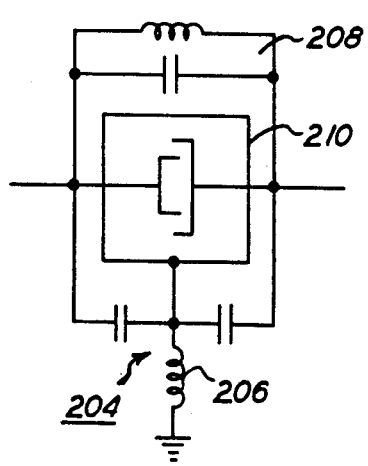

FIG. 12 is similar to FIG. 11 and uses a bridge "T" circuit 204 having an inductor 206 in shunt relationship with the input and output ports of the network. A parallel resonant circuit 208 is connected in series relationship with the input and output ports as is the SAW device 210. An all-pass network is defined by the circuits which bridge the resonator and in which the resonator 210 is embedded. The Q's of the LC circuits 204 and 208 are matched by selecting the resistance internal to the inductors or by providing external resistances.

Figure 13:
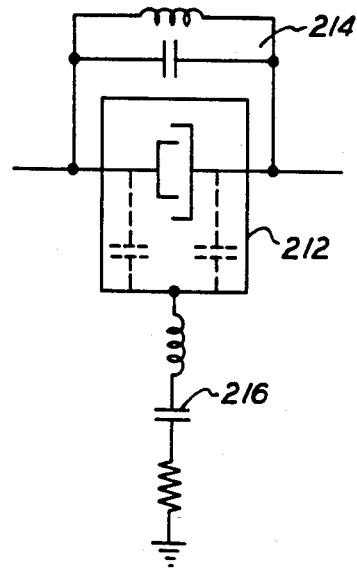

FIG. 13 shows another all-pass network in which a SAW resonator 212 is embedded and connected in series between the input and output terminals or ports of the network. The network has a parallel resonant circuit 214 in series relationship with the input and output ports and a series resonant circuit 216 in shunt relationship with the input and output ports. The parallel resonant circuit 214 is resonant at the notch frequency and will have little effect on the operation of the SAW resonator at the notch frequency, but will bypass the SAW resonator at frequencies removed from the notch frequencies. The series RLC circuit 216 is resonant at the notch frequency and places the resistance thereof in the common point ground of the SAW resonator. At frequencies removed from the notch frequencies the series RLC circuit 216 exhibits a high impedance and decouples the SAW resonator from ground. At notch resonance, the parallel resonant circuit 214 is out of the network. The series resonant circuit 216 places its resistor in the network at frequencies removed from the notch frequency. The parallel resonant circuit 214 reduces the path across the SAW resonator 212 to essentially a short circuit. The shunt path is also decoupled from ground by the series resonant circuit 216. The SAW device is therefore out of the circuit. There may be some losses in the transitional region where the series resonant circuit 216 and the parallel circuit 214 provide some coupling between the input and output and from the input and output to ground.

FIG. 14 defines another network where the notch is formed by the SAW resonator. The SAW resonator 218 is connected to the input and output terminals by inductors 220 and 222 which are in the circuit for impedance matching and may be replaced by other matching networks. There are provided two shunt inductors 224 and 226 which resonate with the internal capacitance to the case of the SAW device 218. The remaining passband in series relationship with the input and output terminals and across the SAW device is provided by an LC notch filter 228. The overall response of the notch circuit 228 and the circuit provided by the inductors 224 and 226 with the inherent capacitance of the SAW device to its case provides an all-pass network except for the notch provided by the SAW device 218.

FIG. 15 shows another circuit which is used with a dual SAW device 230. This device is exemplified by two RLC equivalent circuits 232 and 234 between the inputs and outputs thereof. A parallel resonant LC circuit 236 is in series relationship with the input and output and is coupled thereto by impedance matching transformers 238 and 240. An RLC circuit 242 between the primary and secondary of the transformers 238 and 240, respectively, defines a low Q path which provides phase correction at the notch frequency. The tank circuit 236 which may utilize the inherent capacitance of the SAW device operates like the parallel resonant circuits 200, 208 and 214 described in connections with FIGS. 11, 12 and 13.

The transformer 238 increases or steps up the impedance presented by the input to SAW device 230 and reverses the phase of the input signal. The phase may also be reversed by connecting the transducers of the SAW resonator device 230 to reverse the phase. Stepped up impedance can provide a bandpass in the notch with straighter skirts than without the increased impedance. The output transformer 240 steps the impedance back down without reversing the phase. At the notch frequency, the shunt path including the series RLC circuit 242 and the transformers 238 and 240 provides a signal which is equal in amplitude and opposite in phase from the signal provided by the parallel resonant branch 236. An all-pass response is therefore provided by these circuits 236 and 242 together with the transformers 238 and 240.

Referring to FIG. 16 there is shown a network with a series SAW device 250 and a shunt SAW device 252. The all-pass network is provided by a parallel resonant circuit 254 in series relationship between the input and output ports. The shunt circuit consists of the bridging inductors 256 and 258, and the shunt capacitor 260 completes the all-pass network. The notch is enhanced by reason of the shunt SAW device 252. Both SAW devices 250 and 252 are identical in their notch response and are matched in Q. The shunt capacitor 260 may be the inherent capacity of the shunt SAW device 252.

FIG. 17 illustrates a pair of networks including SAW devices 270 and 272 connected in series between the input and output ports of the network. The devices shown in FIG. 17 are similar to those shown in FIG. 12 except that the internal or inherent capacitors in the devices are allowed to float. The inherent capacity across the SAW devices resonates with the inductors. Their inductors 284 and 286 to ground provide the series resonant circuits; forming all-pass networks. The cascading of the networks as shown in FIG. 17 provides a narrower notch than a single resonator network alone.

From the foregoing description it will be apparent that there has been provided improved jamming signal systems for securing premium television channels. There may be variations and modifications to the herein described systems. For example, additional jamming carriers in the full sideband of the TV signal remote from the picture carrier may be used together with the system as is described herein. Such carriers may be switched in and out alternately with the jamming signal which is close to the picture carrier. Other modulation may be provided in order to further distort the jammed signal. It is believed, however, that the systems for generating and combining the jamming signal as herein described are preferable and may be used alone and without additional jamming carriers to effect a high degree of security for the premium channel which cannot be readily defeated. Other variations and modifications of the herein described systems and networks, within the scope of the invention, will undoubtedly suggest themselves to those skilled in the art. Accordingly the foregoing description should be taken as illustrative and not in a limiting sense.

We claim:

1. A system for processing television signals in the form of one sideband and the vestigial sideband of a picture carrier modulated by video and synchronization signals, including horizontal sync signals, in order to provide for the intelligible reception thereof by the TV receivers of certain subscribers, said system comprising means for combining said television signals with jamming signal energy the frequency of which is substantially at the frequency of one of the nulls in the spectrum of the modulation of said picture carrier by said horizontal sync signals means for transmitting said combined jamming and television signals to receiver locations, and means at said locations disposed ahead of said TV receivers defining a passband for the transmitted signals without substantial attenuation except at a notch essentially in the frequency region containing said jamming signal energy.

2. The system according to claim 1 wherein said jamming signal energy frequency is in the frequency region of said vestigial sideband.

3. The system according to claim 2 wherein said jamming signal energy is at the one of said nulls closest to said picture carrier.

4. The system according to claim 1 wherein said jamming signal energy is centered approximately at at least one of following frequencies which respectively are offset in KHz from the frequency of the picture carrier by ±196.7, ±228.1, ±401.2, ±448.4, ±621.5, ±653.0, ±826.0, ±873.3, ±1046.3, and ±1077.8.

5. The system according to claim 1 wherein said jamming signal energy frequency is also approximately at odd integral multiples of the frequency of one-half the repetition frequency of said horizontal sync signals.

6. The system according to claim 1 wherein said jamming signal energy frequency is also offset from the picture carrier frequency by a frequency which approximately is in a range ±5 KHz about an integral multiple of 25 KHz.

7. The system according to claim 1 wherein said jamming signal energy frequency also is approximately at odd integral multiples of one-half the repetition frequency of said horizontal sync signals and is also offset from the picture carrier frequency in a range ±5 KHz about integral multiples of 25 KHz.

8. The system according to claim 2 further comprising preemphasis means for increasing the amplitude of said transmitted television signals in said one sideband and offset from said picture carrier frequency by the same offset as said jamming signal energy has from said picture carrier whereby to compensate for the removal of said energy by said notch attenuation means.

9. The system according to claim 2 further comprising means in said transmitting means for reducing the amplitude of said television signal's vestigial sideband to an extent sufficient to reduce artifacts arising from the removal of the jamming signal energy by said notch attenuation means.

10. The system according to claim 1 further comprising means for modulating said jamming signal with another signal at the frequency of said horizontal sync and offset in phase so that the envelope of said modulated jamming signal is reduced in amplitude when the sync signals of said television signal are present, said combining means being operative to combine said modulated jamming signal with said television signals.

11. The system according to claim 10 wherein said jamming signal modulating means includes means operative to suppress said jamming signal and provide signals corresponding to the modulation sidebands of said jamming signal and said another signal as said modulated jamming signal.

12. The system according to claim 10 further comprising means for inhibiting said jamming signal modulating means during the vertical synchronizing interval of said television signals.

13. The system according to claim 1 further comprising means for generating said television signals at intermediate frequency, jamming signal generating means operative at intermediate frequency, said combining means also being operative at intermediate frequency, and said transmitting means including up-converter means for translating said combined television and jamming signals to a predetermined radio frequency channel for transmission.

14. The system according to claim 1 further comprising means for generating said television signals at intermediate frequency, means for up converting said television signals to a predetermined radio frequency channel, means for generating said jamming signal at radio frequency in said channel, said combining means being operative to combine said up-converted television signals with said jamming signal for transmission in said channel.

15. The system according to claim 1 further comprising jamming signal generating means including means for providing, with said jamming signal and picture carrier, a first signal of frequency equal to the difference between the picture carrier frequency and the jamming signal frequency which is of a frequency which is an integral multiple of a second signal of frequency related to the horizontal sync frequency, and means responsive to said first and second signals and means for phase locking said jamming signal at a frequency which is offset from said picture carrier frequency by a said multiple of said second signal frequency.

16. The system according to claim 15 further comprising means operative to provide said jamming signal offset at a frequency which is about one-half between integral multiples of said horizontal sync frequency.

17. The system according to claim 16 wherein said means defined in claim 16 is provided by means responsive to said horizontal sync signal for generating said second signal at a frequency equal to an integral multiple of one-half the horizontal sync frequency.

18. The system according to claim 16 wherein said second signal is of the horizontal sync frequency, and the means defined in claim 16 comprises means for modulating said jamming signal with a signal equal to an odd multiple of the horizontal sync frequency, and suppressing said jamming signal frequency to produce as said jamming signal a pair of sideband signals, one at said jamming frequency plus said odd submultiple frequency and the other at said jamming signal frequency minus said odd submultiple frequency.

19. The system according to claim 1 further comprising means for offsetting the frequency of said jamming signal by a certain frequency offset, temperature responsive means for enabling said offsetting means only when the temperature has changed from a nominal temperature by a certain amount to compensate for the effect of temperature upon said attenuating means.

20. The system according to claim 1 wherein said means at said locations includes means defining an all-pass network between an input for said combined television and jamming signals and an output for said television signals, and in addition to said all-pass network at least one surface acoustic wave (SAW) device resonant at the frequency of said notch between said input and said output.

21. The system according to claim 20 wherein said all-pass network is defined by capacitors connected between said input and said output and having a function therebetween, a resistor connected in shunt with said input to said junction, to define a "T" circuit, said SAW device being connected across said capacitors in bridging relationship with said "T" circuit.

22. The system according to claim 20 wherein said all-pass network includes a first branch and a second branch both resonant at said notch frequency, said first branch being in series relationship with said input and output, said second branch being in shunt relationship between said input and output, and the Q's of said first and second branches being approximately equal.

23. The system according to claim 22 wherein said first and second branches are parallel resonant circuits.

24. The system according to claim 22 wherein said first branch is a parallel resonant circuit and said second branch is a series resonant circuit.

25. The system according to claim 24 wherein said second branch has first and second capacitors connected between said input and output and having a junction therebetween, and an inductor and resistor connected to said junction in shunt relationship with said first and second capacitors.

26. The system according to claim 22 wherein said first circuit includes inductive and capacitive elements defining a passband phase characteristic with a notch at said jamming signal frequency and connected to said SAW device by first and second inductors, one of which is connected to said input and the other to said output, said second circuit including third and fourth inductors respectively connected to opposite ends of said SAW device in shunt relationship with said input and output to define a passband characteristic with a notch at said jamming signal frequency.

27. The system according to claim 20 further comprising a SAW device having a dual SAW resonator connected between said input and output by first and second transformers having primary and secondary windings connected in shunt relationship with said input and output, a series resonant circuit connected between said input and output, and a parallel resonant circuit connected across said dual SAW resonator device.

28. The system according to claim 22 further comprising a second SAW device resonant at said notch frequency and connected in said second circuit in shunt relationship with said input and output.

29. The system according to claim 28 wherein said second circuit has first and second inductors connected between said input and said output and having a junction therebetween, said second SAW device being connected to said junction at one end thereof.

30. The system according to claim 22 branches wherein a plurality of said all-pass circuits as defined in claim 22 and connected in cascade between said input and output with the SAW devices thereof connected in series with each other between said input and said output.

31. A system for processing television signals in order to provide for the intelligible reception thereof by the TV receivers of certain subscribers, in the form of one full sideband and the vestigial sideband of a picture carrier modulated by video and synchronization signals, including horizontal sync pulses, which also imposes a spectrum centered about the frequency of said picture carrier, said spectrum consisting of components at harmonics of the frequency of said horizontal sync pulses having nulls at the frequencies which are equal to the reciprocal of the duration of said horizontal sync pulses, said system comprising means for combining said television signals with jamming signal energy the frequency of which is offset from said picture carrier and is within one of said nulls within the range where the amplitude of said spectrum is within about 1% of the level of said picture carrier, means for transmitting said combined television and jamming signals to TV receiver locations, and means at said locations disposed ahead of said receivers defining a passband for the transmitter signals without substantial attenuation except at a notch at the frequency of said jamming signal energy.

32. The system according to claim 31 wherein said jamming frequency energy is also approximately at one of the nulls of said spectrum closest to said picture carrier.

33. The system according to claim 32 wherein said jamming signal energy is also between the frequencies of two of said harmonic components.

34. The system according to claim 33 wherein said jamming signal energy is also within ±5 KHz of a multiple of 25 KHz offset from the frequency of said picture carrier.

35. The system according to claim 34 wherein said jamming signal energy is approximately at a frequency selected from the group consisting of the following frequencies which are frequencies in KHz offset above and below the picture carrier frequency of 196.7, 228.1, 401.2, 448.4, 621.5, 653.0, 826.0, 873.3, 1046.1, and 1077.8.

36. The system according to claim 31 wherein said jamming signal energy is in the vestigial sideband.

37. The system according to claim 36 further comprising preemphasis means for increasing the amplitude of said transmitted television signals in said one sideband and offset from said picture carrier frequency by the same offset as said jamming signal energy has from said picture carrier whereby to compensate for the removal of said energy by said notch attenuation means.

38. The system according to claim 36 further comprising means in said transmitting means for reducing the amplitude of said television signal's vestigial sideband to an extent sufficient to reduce artifacts arising from the removal of the jamming signal energy by said notch attenuation means.

39. The system according to claim 31 further comprising means for modulating said jamming signal with another signal at the frequency of said horizontal sync and offset in phase so that the envelope of said modulated jamming signal is reduced in amplitude when the sync signals of said television signal are present, said combining means being operative to combine said modulated jamming signal with said television signals.

40. The system according to claim 39 wherein said jamming signal modulating means includes means operative to suppress said jamming signal and provide signals corresponding to the modulation sidebands of said jamming signal and said another signal as said modulated jamming signal.

41. The system according to claim 40 further comprising means for inhibiting said jamming signal modulating means during the vertical synchronizing interval of said television signals.

42. The system according to claim 31 further comprising means for generating said television signals at intermediate frequency, jamming signal generating means operative at intermediate frequency, said combining means also being operative at intermediate frequency, and said transmitting means including up-converter means for translating said combined television and jamming signals to a predetermined radio frequency channel for transmission.

43. The system according to claim 31 further comprising means for generating said television signals at intermediate frequency, means for up converting said television signals to a predetermined radio frequency channel, means for generating said jamming signal at radio frequency in said channel, said combining means being operative to combine said up-converted television signals with said jamming signal for transmission in said channel.

44. The system according to claim 31 further comprising means for offsetting the frequency of said jamming signal by a certain frequency offset, temperature responsive means for enabling said offsetting means only when the temperature has changed from a nominal temperature by a certain amount to compensate for the effect of temperature upon said attenuating means.

45. The system according to claim 31 wherein said means at said locations includes means defining an all-pass network between an input for said combined television and jamming signals and an output for said television signals, and in addition to said all-pass network at least one surface acoustic wave (SAW) device resonant at the frequency of said notch between said input and said output.

46. The system according to claim 45 wherein said all-pass network includes a first branch and a second branch both resonant at said notch frequency, said first branch being in series relationship with said input and output, said second branch being in shunt relationship between said input and output, and the Q's of said first and second branches being approximately equal.

47. The system according to claim 46 wherein said first and second branches are parallel resonant circuits.

48. The system according to claim 46 wherein said first branch is a parallel resonant circuit and said second branch is a series resonant circuit.

49. The system according to claim 48 wherein said second branch has first and second capacitors connected between said input and output and having a junction therebetween, and an inductor and resistor connected to said junction in shunt relationship with said first and second capacitors.

50. The system according to claim 46 wherein said first circuit includes inductive and capacitive elements defining a passband phase characteristic with a notch at said jamming signal frequency and connected to said SAW device by first and second inductors one of which is connected to said input and the other to said output, said second circuit including third and fourth inductors respectively connected to opposite ends of said SAW device in shunt relationship with said input and output to define a passband characteristic with a notch at said jamming signal frequency.

51. The system according to claim 45 further comprising a SAW device having a dual SAW resonator connected between said input and output by first and second transformers having primary and secondary windings connected in shunt relationship with said input and output, a series resonant circuit connected between said input and output, and a parallel resonant circuit connected across said dual SAW resonator device.

52. The system according to claim 46 further comprising a second SAW device resonant at said notch frequency and connected in said second circuit in shunt relationship with said input and output.

53. The system according to claim 52 wherein said second circuit has first and second inductors connected between said input and said output and having a junction therebetween, said second SAW device being connected to said junction at one end thereof.

54. The system according to claim 46 branches wherein a plurality of said all-pass circuits as defined in claim 22 are connected in cascade between said input and output with the SAW devices thereof connected in series with each other between said input and said output.

55. A network for removing a jamming signal combined with a television signal, said jamming signal being located in the vestigial sideband of said television signal or in the full sideband within a frequency range from the picture carrier including the spectrum of the modulation of said picture carrier by the horizontal sync signals of said television signal of amplitude of significant relationship to the amplitude of said picture carrier, said network comprising means defining a passband for said combined television and jamming signal without substantial attenuation except at a notch containing the frequency of said jamming signal, and where said last named means includes means defining an all-pass network between an input for said combined television and jamming signals and an output for said television signals and in addition to said all-pass network at least one surface acoustic wave (SAW) device resonant at the frequency of said notch between said input and said output.

56. The network according to claim 55 wherein said all-pass network is defined by capacitors connected between said input and said output and having a junction therebetween, a resistor connected in shunt with said input to said junction to define a "T" circuit, said SAW device being connected across said capacitors in bridging relationship with said "T" circuit.

57. The network according to claim 55 wherein said all-pass network includes a first branch and a second branch both resonant at said notch frequency, said first branch being in series relationship with said input and output, said second branch being in shunt relationship between said input and output, and the Q's of said first and second branches being approximately equal.

58. The network according to claim 57 wherein said first and second branches are parallel resonant circuits.

59. The network according to claim 57 wherein said first branch is a parallel resonant circuit and said second branch is a series resonant circuit.

60. The network according to claim 59 wherein said second branch has first and second capacitors connected between said input and output and having a junction therebetween, and an inductor and resistor connected to said junction in shunt relationship with said first and second capacitors.

61. The network according to claim 57 wherein said first circuit includes inductive and capacitive elements defining a passband phase characteristic with a notch at said jamming signal frequency and connected to said SAW device by first and second inductors one of which is connected to said input and the other to said output, said second circuit including third and fourth inductors respectively connected to opposite ends of said SAW device in shunt relationship with said input and output to define a passband characteristic with a notch at said jamming signal frequency.

62. The network according to claim 55 further comprising a SAW device having a dual SAW resonator connected between said input and output by first and second transformers having primary and secondary windings connected in shunt relationship with said input and output, a series resonant circuit connected between said input and output, and a parallel resonant circuit connected across said dual SAW resonator device.

63. The network according to claim 57 further comprising a second SAW device resonant at said notch frequency and connected in said second circuit in shunt relationship with said input and output.

64. The network according to claim 63 wherein said second circuit has first and second inductors connected between said input and said output and having a junction therebetween, said second SAW device being connected to said junction at one end thereof.

65. The network according to claim 55 branches wherein a plurality of said all-pass circuits as defined in claim 22 and connected in cascade between said input and output with the SAW devices thereof connected in series with each other between said input and said output.

* * * * *